(12) United States Patent
Kaji (10) Patent No.: US 8,184,813 B2
(45) Date of Patent: May 22, 2012

(54) ENCRYPTION KEY GENERATION DEVICE

(75) Inventor: Yuichi Kaji, Ikoma (JP)

(73) Assignee: National University Corporation Nara Institute of Science and Technology, Nara (JP)

( * ) Notice: Subject to any disclaimer, the term of this patent is extended or adjusted under 35 U.S.C. 154(b) by 1017 days.

(21) Appl. No.: 11/795,770

(22) PCT Filed: Dec. 9, 2005

(86) PCT No.: PCT/JP2005/022617
§ 371 (c)(1), (2), (4) Date: Jun. 9, 2008

(87) PCT Pub. No.: WO2006/077697
PCT Pub. Date: Jul. 27, 2006

(65) Prior Publication Data
US 2009/0122981 A1    May 14, 2009

(30) Foreign Application Priority Data
Jan. 24, 2005   (JP) .................................. 2005-016142

(51) Int. Cl.
*H04L 9/00* (2006.01)
(52) U.S. Cl. ........... 380/277; 713/170; 713/176; 380/30
(58) Field of Classification Search .................... 380/30, 380/277; 713/170, 176
See application file for complete search history.

(56) References Cited

U.S. PATENT DOCUMENTS

| | | | |
|---|---|---|---|
| 6,816,595 B1 | 11/2004 | Kudo | |
| 6,986,044 B1 * | 1/2006 | Inada | 713/170 |
| 7,286,665 B1 * | 10/2007 | Wang | 380/30 |
| 7,363,499 B2 * | 4/2008 | Perlman | 713/176 |
| 2003/0002662 A1 * | 1/2003 | Nishioka et al. | 380/30 |
| 2004/0174999 A1 * | 9/2004 | Iwamura et al. | 380/277 |
| 2005/0063546 A1 | 3/2005 | Kudo | |
| 2005/0078825 A1 * | 4/2005 | Ohmori et al. | 380/255 |

(Continued)

FOREIGN PATENT DOCUMENTS
JP     07-072793     3/1995
(Continued)

OTHER PUBLICATIONS

Andrew C. Yao, Theory and Application of Trapdoor Funcions, 1982, IEEE, pp. 80-91.*

(Continued)

*Primary Examiner* — Eleni Shiferaw
*Assistant Examiner* — Tamara Teslovich
(74) *Attorney, Agent, or Firm* — Harness, Dickey & Pierce, P.L.C.

(57) ABSTRACT

A scramble key generation unit generates scramble keys (individual encryption keys) which are different from one another and which are for encrypting and decrypting distributing data, by subjecting a predetermined initial encryption key at least once to a unidirectional reverse replacement and at least once to a trapdoor-equipped unidirectional replacement. A time key generation unit generates a time key (master encryption key) for regenerating the scramble keys, by subjecting any of the scramble keys generated by the scramble key generation unit at least once to the unidirectional reverse replacement. Thus, it is possible to efficiently and flexibly generate the individual encryption keys for encrypting and decrypting the distribution data, and master encryption key capable of regenerating some of the individual encryption keys.

9 Claims, 3 Drawing Sheets

U.S. PATENT DOCUMENTS

| | | | | |
|---|---|---|---|---|
| 2006/0059179 | A1* | 3/2006 | Asano | 707/100 |
| 2007/0177727 | A1* | 8/2007 | Nishioka et al. | 380/30 |
| 2009/0161875 | A1 | 6/2009 | Kudo | |

FOREIGN PATENT DOCUMENTS

| | | |
|---|---|---|
| JP | 11-296076 | 10/1999 |

OTHER PUBLICATIONS

Tom Davis, RSA Encryption, Oct. 10, 2003, http://www.geometer.org/mathcircles/RSA.pdf.*

Y. Suga and K. Iwamura: "Key derivation scheme for the sequential contents," Computer Security Symposium 2004, IPSJ Japan, pp. 481-486.

M. Kuribayashi and H. Tanaka: "A New Key Generation Method for Broadcasting System with Expiration Date," The 27th Symposium on Information Theory and Its Applications, SITA Japan, pp. 323-326.

Y. Kaji and R. Nojima: "A Management Scheme for Time-Limited Cryptographic Keys" Industrial Session Proceedings of the Third International Conference on Applied Cryptography and Network Security, New York, New York, pp. 106-117 (Jun. 2005, reviewed).

Japanese Office Action dated Nov. 24, 2010 issued in corresponding Japanese Application No. 2005016142 with English translation.

Ryo Nojima, et al., "*Secure, Efficient and Practical Key Management Scheme in the Complete-Subtree Method*", IEICE Trans. Fundamentals, vol. E 88-A, No. 1, Jan. 2005, pp. 189-194.

Ryo Nojima, Yu'Ichi Kaji, "Otoshido Tsuki Ichihokosei Kansu o Riyo Shita Kikozo Kagi Kanri Hoshiki" 2003 Symposium on Cryptography and Information Security Yokoshu, vol. 1 of 2, (Jan. 26, 2003), pp. 131 to 136.

Yu'Ichi Kaji, Ryo Nojima, "Jikan Gentei Service o Jitsugen suru Tameno Jikeiretsu Kagi Kanri Hoshiki" 2005 Symposium on Cryptography and Information Security Yokoshu, vol. 1 of 4, (Jan. 25, 2005). p. 289 to 294.

* cited by examiner

ENCRYPTION KEY GENERATION DEVICE

TECHNICAL FIELD

The present invention relates to a technology of generating an encryption key capable of decrypting predetermined specific encrypted data.

BACKGROUND ART

There are a number of information-related services today, and there is a need of preventing unauthorized uses of such services by a third person or an unauthorized user. To do this, there has been a technology of distributing, only to an authorized user, an encryption key needed for deciphering (decrypting) encrypted text (encrypted data). Using this technology, a user is provided with services via a communication and/or a broadcast communication path. Such services can be: for example, a service of distributing movies or the like contents or a service of providing a network resource such as wireless LAN.

Meanwhile, users are demanding for time-limited services which provide information only during a predetermined period designated: i.e., during a particular period specified. Such services are for example: a paid TV broadcasting which can be viewed for only 1 hour, or a wireless LAN service which can be used for only 30 min.

In response to the demand, a format of an encryption key for realizing a time-specified information service is disclosed in the following documents: Non-Patent Citation 1 (M. Kuribayashi and H. Tanaka: "A New Key Generation Method for Broadcasting System with Expiration Date," 27th Symp. on Information Theory and Its Applications (SITA2004), pp. 323-326 (2004)); and Non-Patent Citation 2 (Suga, Iwamura: "Key Generation Method for Access Control for One Dimensional Contents", Computer Security Symposium 2004 (css2004), pp. 481-486 (2004)). Non-Patent Citation 1 discloses a method of following updating of key during a limited period of time, by utilizing a behavior of logistic mapping. Non-Patent Citation 2 discloses a method of deriving an encryption key which allows decryption of a specific portion of contents.

DISCLOSURE OF INVENTION

However, the foregoing methods disclosed in Non-Patent Citations 1 and 2 have not yet reached to the level of practical application. For example, due to insufficient efficiency and flexibility in generating an encryption key, there is a limit to a limitation of the time and the number of data sets that can be decrypted.

The present invention was made in order to solve the foregoing problem, and it is an object of the present invention to provide an encryption key generation device, an encryption key generation method, an encryption key generation program, and a computer-readable storage medium storing the encryption key generation program each capable of efficiently and flexibly generating plural individual encryption keys for encryption and decryption of input data, and a master key capable of regenerating some of the individual encryption keys.

A second object of the present invention is to provide an encrypted data distribution device which encrypts input data with a use of individual encryption keys generated by the encryption key generation device, and to distribute the encrypted input data to the encrypted data receiving device.

A third object of the present invention is to provide an individual encryption key regeneration device which regenerates individual encryption keys with a use of a master encryption key generated by the encryption key generation device.

A fourth object of the present invention is to provide an encrypted data receiving device which receives encrypted data distributed from the encrypted data distribution device, regenerates the individual encryption keys with a use of the master encryption key, and partially decrypts the received encrypted data with a use of the individual encryption keys thus regenerated.

A fifth object of the present invention is to provide an encrypted data distribution system including the encrypted data distribution device and the encrypted data receiving device.

In order to achieve the foregoing object, an encryption key generation device of the present invention is an encryption key generation device which generates encryption keys by (i) a first trapdoor-equipped unidirectional replacement and a second trapdoor-equipped unidirectional replacement which are compatible and publicly disclosed, (ii) a first unidirectional reverse replacement which is a reverse replacement of the first trapdoor-equipped unidirectional replacement and which is not publicly disclosed, and (iii) a second unidirectional reverse replacement which is a reverse replacement of the second trapdoor-equipped unidirectional replacement and which is not publicly disclosed, said device including: individual encryption key generation means for generating a plurality of different individual encryption keys, for encrypting and decrypting input data, by subjecting a predetermined initial encryption key at least once to the first unidirectional reverse replacement and at least once to the second trapdoor-equipped unidirectional replacement; and master encryption key generation means for generating a master encryption key, for regenerating the individual encryption keys, by subjecting any one of the individual encryption keys generated by said individual encryption keys generation means at least once to at least one of the first unidirectional reverse replacement and the second unidirectional reverse replacement.

The encryption key generation device of the present invention generates individual encryption keys and a master encryption key, based on a public key encryption method. Specifically, the encryption key generation device generates an encryption key by: the first and second trapdoor-equipped unidirectional replacements which are compatible and which are publicly disclosed; a first unidirectional reverse replacement which is a reverse replacement of the first trapdoor-equipped unidirectional replacement and which is not publicly disclosed; and a second unidirectional reverse replacement which is a reverse replacement of the second trapdoor-equipped unidirectional replacement and which is not publicly disclosed.

Here, the wording "compatible" means as follows. Namely, when a single set of input data is subject to the first and second trapdoor-equipped unidirectional replacements the same number of times, conditions for acquiring an identical output data is established irrespective of the order of subjecting the input data to the first and second trapdoor-equipped unidirectional replacements. More specifically, from the encryption key generation device 20, output data of the same value is resulted from the following cases: (i) a certain set of input data is subjected to the first trapdoor-equipped unidirectional replacement once, and then to the second trapdoor-equipped unidirectional replacement; (ii) the certain set of input data is subjected to the second trapdoor-equipped unidirectional replacement, and then to the first trapdoor-equipped unidirectional replacement.

The first unidirectional reverse replacement is a reverse replacement of the first trapdoor-equipped unidirectional replacement. Thus, in the encryption key generation device 20, the original input data is acquired by subjecting, to the first unidirectional reverse replacement, output data resulted by subjecting the input data to the first trapdoor-equipped unidirectional replacement. The same goes for a case of the second trapdoor-equipped unidirectional replacement and the second unidirectional reverse replacement. That is, the second unidirectional reverse replacement is a reverse replacement of the second trapdoor-equipped unidirectional replacement. Therefore, in the encryption key generation device 20, the original input data is acquired by subjecting, to the second unidirectional reverse replacement, output data resulted by subjecting the input data to the second trapdoor-equipped unidirectional replacement.

Note that the encryption key generation device 20 employs the second trapdoor-equipped unidirectional replacement which is compatible with the first trapdoor-equipped unidirectional replacement, but not the same. Thus, the respective values of all the individual encryption keys generated by the first and second trapdoor-equipped unidirectional replacements are prevented from being the same. Further, in general, the first trapdoor-equipped unidirectional replacement and the first unidirectional reverse replacement are also compatible with each other. However, it is unlikely that the encryption key generation device 20 uses the first unidirectional reverse replacement as the second trapdoor-equipped unidirectional replacement. In other words, the encryption key generation device 20 uses the second trapdoor-equipped unidirectional replacement which differs from the first unidirectional reverse replacement. This also prevents the respective values of all the individual encryption keys generated by the first and second trapdoor-equipped unidirectional replacements from being the same.

With the above-described configuration, the individual encryption key generation means generates a plurality of different individual encryption keys. Here, an individual encryption key amongst those individual encryption keys generated is not generated from another individual encryption key unless the other individual encryption key is subjected to at least one of the first or second unidirectional reverse replacement. In other words, even if an individual encryption key is subjected to the first or second trapdoor-equipped unidirectional replacement, it is not possible to regenerate another one of the above-described individual encryption keys. Thus, each of the individual encryption keys are successively generated from an initial encryption key, and does not correspond to any one of the other individual encryption keys for encrypting input data.

On the other hand, the master encryption key generation means generates a master encryption key, for regenerating the individual keys, by subjecting one of the individual encryption keys at least once to at least one of the first unidirectional reverse replacement and the second unidirectional reverse replacement.

Here, in general, it is extremely difficult to derive the non-publicly-disclosed first unidirectional reverse replacement based on the publicly-disclosed first trapdoor-equipped unidirectional replacement. Similarly, it is extremely difficult to derive the non-publicly-disclosed second unidirectional reverse replacement from the publicly-disclosed second trapdoor-equipped unidirectional replacement. The expression "difficult" means the following. Although it is theoretically possible to derive the first and second unidirectional reverse replacements by a certain algorithm, the algorithm involves an enormous amount of calculations for its completion. Thus, the expression "difficult" means that it is unfeasible to derive the first and second unidirectional reverse replacements within a realistic and practical period even with a use of currently known fastest computer let alone the human calculation. Due to the difficulty, the individual encryption key regeneration device for regenerating the individual encryption keys by using the input master encryption key is not able to subject the master encryption key to the first and second unidirectional reverse replacements which are not publicly disclosed, though it is able to subject the master encryption key to the first and second trapdoor-equipped unidirectional replacements which are publicly disclosed.

Thus, a master encryption key, once it is generated, is not able to be subjected to the first or the second unidirectional reverse replacement which is not publicly disclosed. In other words, once the master encryption key is generated, the individual encryption keys which are not generated unless they are subjected to the first or the second unidirectional reverse replacement are not regenerated from the master encryption key.

Meanwhile, amongst the plurality of the different individual encryption keys generated by the individual encryption key generation means, one individual encryption key is not regenerated from another individual encryption key unless the other individual encryption key is subjected to at least one of the first and second unidirectional reverse replacements. Accordingly, from a master encryption key having been generated, it is possible to regenerate only some of the individual encryption keys amongst those generated by the individual encryption key generation means. Specifically, from the master encryption key, it is possible to regenerate only those individual encryption keys, amongst the individual encryption keys for encrypting input data, which can be regenerated by subjecting the master encryption key to either the first trapdoor-equipped unidirectional replacement or the second trapdoor-equipped unidirectional replacement, or both.

That is the master encryption key generation means generates a master encryption key which allows regeneration of some of the plurality of individual encryption keys. Here, the larger the number of times an individual encryption key is subjected to either the first unidirectional reverse replacement or the second unidirectional reverse replacement, or both, wider the range (the larger the number) of the individual encryption keys the resulting master encryption key is able to regenerate.

As described, the present device allows efficient and flexible generation of (i) a plurality of individual encryption keys for encrypting and decrypting input data; and (ii) a master encryption key which allows regeneration of some of the plurality of individual encryption keys.

In order to achieve the foregoing object an encryption key generation method of the present invention is an encryption key generation method for generating encryption keys by (i) a first trapdoor-equipped unidirectional replacement and a second trapdoor-equipped unidirectional replacement which are compatible and publicly disclosed, (ii) a first unidirectional reverse replacement which is a reverse replacement of the first trapdoor-equipped unidirectional replacement and which is not publicly disclosed, and (iii) a second unidirectional reverse replacement which is a reverse replacement of the second trapdoor-equipped unidirectional replacement and which is not publicly disclosed, said method including the steps of: (A) generating a plurality of different individual encryption keys, for encrypting input data, by subjecting a predetermined initial encryption key at least once to the first unidirectional reverse replacement and at least once to the second trapdoor-equipped unidirectional replacement; and (B) generating a master encryption key by subjecting any one of the generated individual encryption keys at least once to the first unidirectional reverse replacement and the second unidirectional reverse replacement.

This configuration yields the same effects as those acquired from the above-described encryption key generation device.

In order to achieve the foregoing object, an encrypted data distribution device of the present invention includes encrypted data generation means for generating encrypted data by encrypting sets of data to be distributed with a use of individual encryption keys generated by the encryption key generation device as set forth in Claim 1; and encrypted data distribution means for distributing the encrypted data to an encrypted data receiving device via a communication network.

In the configuration, the encrypted data distribution device distributes, as encrypted data, input data which has been encrypted by the individual encryption keys to the encrypted data receiving device. Thus, it is possible to provide an encrypted data distribution device capable of distributing encrypted data which can be partially decrypted.

In order to achieve the foregoing object, an individual encryption key regeneration device of the present invention includes master encryption key input means for accepting an input of a master encryption key generated by the above-described encryption key generation device; and individual encryption key regeneration means for subjecting the input master encryption key to either a first trapdoor-equipped unidirectional replacement or a second trapdoor-equipped unidirectional replacement, or both, thereby partially regenerating individual encryption keys having been generated by the above-described encryption key generation device.

In the individual encryption key regeneration device having the above configuration, individual encryption keys are regenerated based on a master key having been generated by the encryption key generation device. As mentioned above, only some of the individual encryption keys amongst those generated by the encryption key generation device is regenerated from the master encryption key. Thus, it is possible to provide an individual encryption key regeneration device which only regenerates some of the individual encryption keys amongst those generated by the encryption key generation device.

In order to achieve the foregoing object, an encrypted data receiving device of the present invention includes: individual encryption key input means for accepting an input of an individual encryption key generated by the above-described individual encryption key regeneration device; encrypted data receiving means for receiving encrypted data distributed by the above-described encrypted data distribution device; and distribution data decryption means for decrypting the received encrypted data by using the input individual encryption key.

With the configuration, it is possible to provide an encrypted data receiving device which decrypts only a portion of distributed encrypted data which portion is set beforehand so that the portion can be decrypted.

In order to achieve the foregoing object, an encrypted data distribution system of the present invention includes: the above-described encrypted data distribution device; and the above-described encrypted data receiving device.

With the configuration, it is possible to provide an encrypted data distribution device which decrypts only a portion of distributed encrypted data which portion is set beforehand so that the portion can be decrypted.

Note that the encryption key generation device may be realized in a form of a computer, in which case the present invention encompasses: an encryption key generation program which realizes the encryption key generation device on a computer by causing the computer to operate as the above-described means; and a computer-readable storage medium storing the encryption key generation program.

Additional objects, features, and strengths of the present invention will be made clear by the description below. Further, the advantages of the present invention will be evident from the following explanation in reference to the drawings.

BEST MODE FOR CARRYING OUT THE INVENTION

Figure 1:
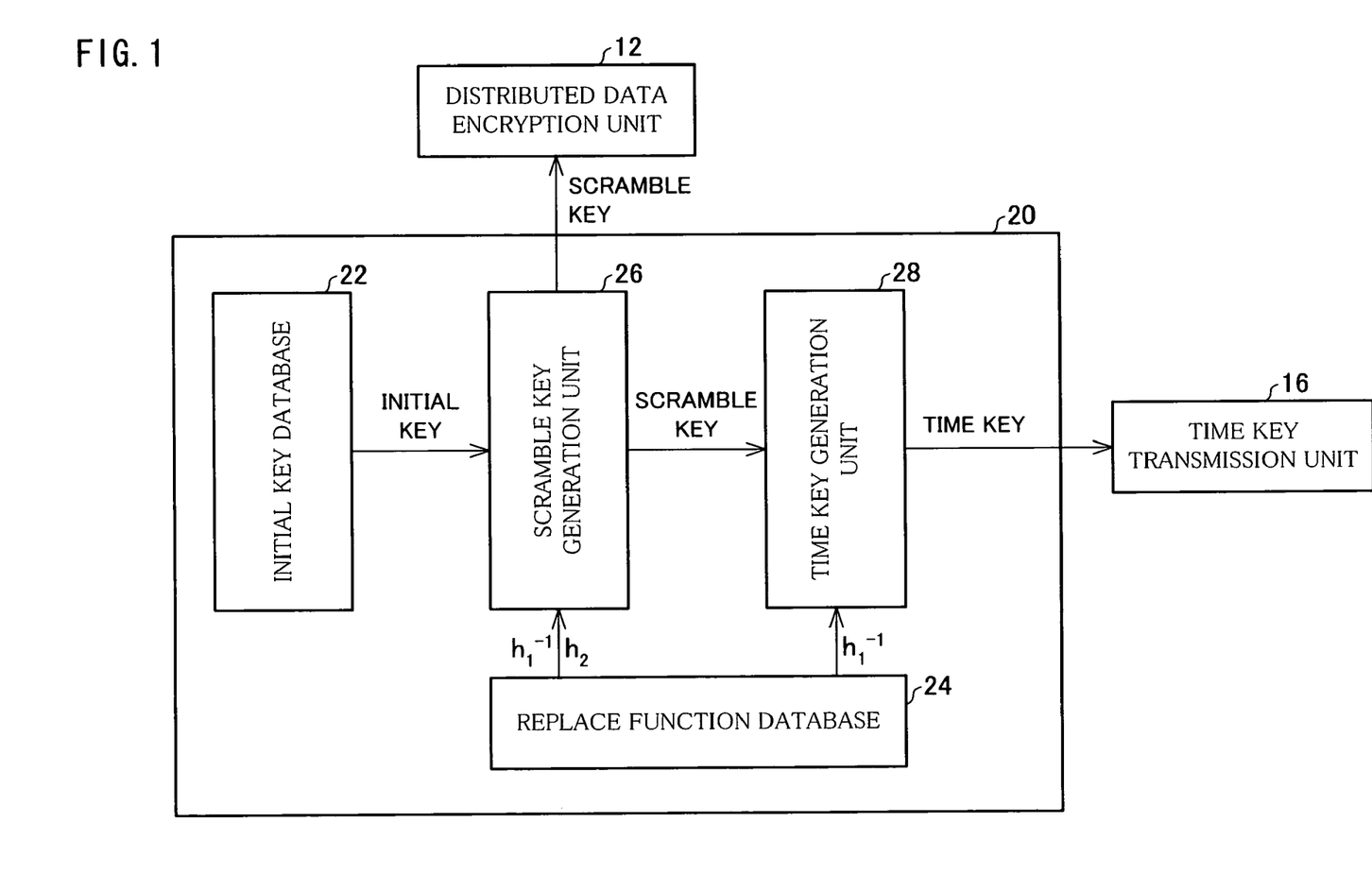
FIG. 1 is a block diagram showing in detail a configuration of an encryption key generation device of the present invention.
Figure 2:
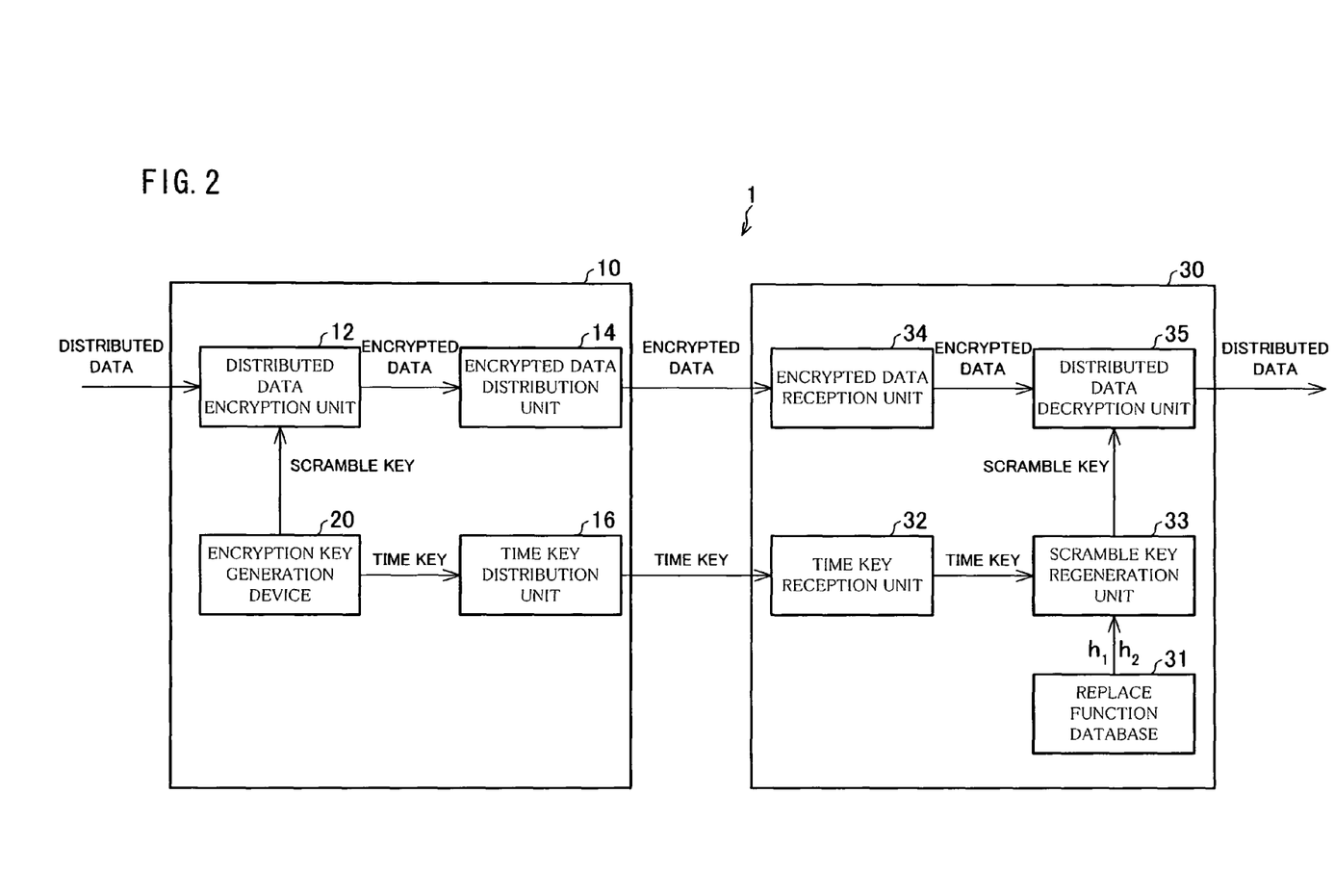
FIG. 2 is a block diagram showing in detail a configuration of an encrypted data distribution system of the present invention.
Figure 3:
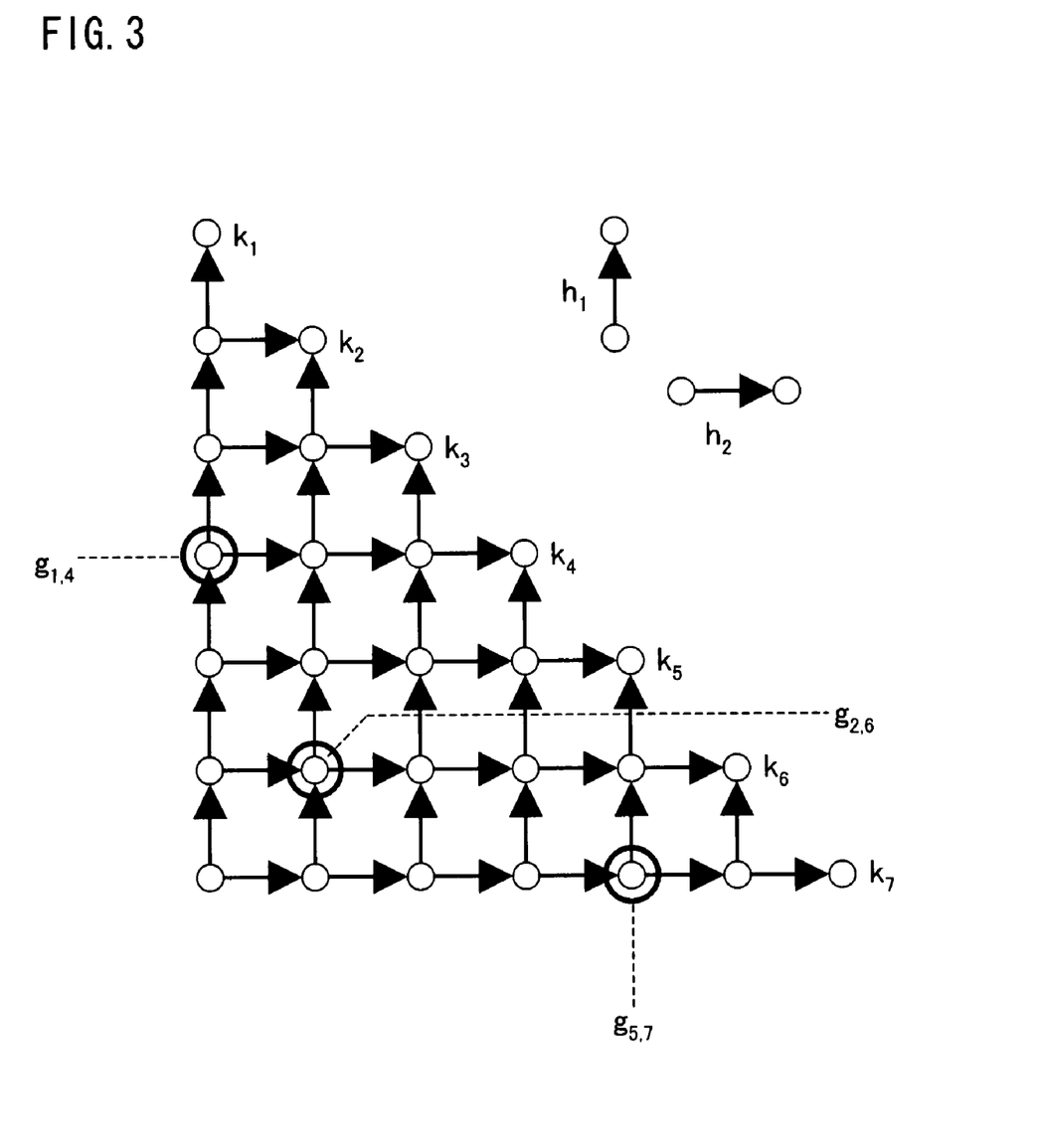
FIG. 3 is an explanatory diagram showing a principal of calculating a scramble key and time key, according to the present invention.

The following describes an embodiment of the present invention with reference to FIG. 1 to FIG. 3.

First described with reference to FIG. 2 is an overview of an encrypted data distribution system 1 of the present invention.

FIG. 2 is a block diagram showing in detail a configuration of the encrypted data distribution system 1 of the present invention. The encrypted data distribution system 1 shown in FIG. 2 is a system including an encrypted data distribution device 10 and an encrypted data receiving device 30. In other words, in the encrypted data distribution system 1, exchanging of encrypted data is performed between an encrypted data distribution device 10 and an encrypted data receiving device 30.

As shown in FIG. 2, the encrypted data distribution device 10 includes an encryption key generation device 20 which generates scramble keys (individual encryption keys) and a time key (master encryption key) by means of a public key encryption method. This is described in detail later. The encryption key generation device 20 provides the generated scramble keys to the encrypted data distribution device 10. With a use of the scramble keys generated by the encryption key generation device 2, the encrypted data distribution device 10 encrypts input distribution data, thereby generating encrypted data which can be decrypted by the scramble keys.

The encrypted data distribution device 10 distributes the encrypted data thus generated to the encrypted data receiving device 30 via a communication network. At the same time, the encrypted data distribution device 10 also distributes, to the encrypted data receiving device 30, the time key generated by the encryption key generation device 20. That is, while the encrypted data distribution device 10 distributes the encrypted distribution data to the encrypted data receiving device 30, it also distributes to the encrypted data receiving device 30 the time key for deriving (regenerating) scramble keys needed for decrypting the distributed encrypted data into the distribution data.

The encrypted data receiving device 30 receives the encrypted data and time key distributed via the communication network. Then, based on the time key having been received, the encrypted data receiving device 30 regenerates the scramble key used for encrypting the distribution data. Then, the encrypted data receiving device 30 decrypts the encrypted data using the scramble key regenerated, thereby generating the original distribution data from the encrypted data distributed. In other words, the encrypted data receiving device 30 restores the distribution data.

In this way, in the encrypted data distribution system 1, encrypted data is exchanged between the encrypted data distribution device 10 and the encrypted data receiving device 30. As hereinafter described, the encrypted data receiving device 30 of the encrypted data distribution system 1 is able to decrypt only a certain part (set by the encrypted data receiving device 30) of the encrypted data. That is, in the encrypted data distribution system 1, the encryption key generation device 20 generates scramble keys which are applicable to a scrambled broadcasting and which are successively renewed to new scramble keys. At the same time, the encryption key generation device 20 generates a time key which restores a certain specific scramble keys amongst the scramble keys generated.

The encryption key generation device 20 generates a time key by which a range of the scramble keys (for encrypting the distribution data) that can be regenerated is flexibly set in advance. Accordingly, the scramble key regeneration unit 33 which regenerates the scramble keys by using the time key is only able to regenerate those scramble keys that are set in advance. That is, the encrypted data receiving device 30 only decrypts a portion of the received encrypted data with a use of the regenerated scramble keys. This allows a partial use of distributed data via the encrypted data distribution system 1.

The encryption key generation device 20 generates the above-described scramble keys and time key by means of the public key encryption method. Further, the scramble key regeneration unit 33 regenerates the scramble keys from the time key by means of the public key encryption method used in the encryption key generation device 20. Here, the following describes in detail the encryption key generation device 20 and the scramble key regeneration unit 33 of the present invention.

First, the encryption key generation device 20 is described in detail with reference to FIG. 1. FIG. 1 is a block diagram showing in detail a configuration of the encryption key generation device 20 of the present invention. As shown in the figure, the encryption key generation device 20 includes: an initial key database 22; a replace function database 24; a scramble key generation unit 26; and a time key generation unit 28.

As described above, the encryption key generation device 20 generates an encryption key by means of a public key encryption method. Specifically, the encryption key generation device 20 generates an encryption key by: publicly-disclosed compatible trapdoor-equipped unidirectional replacements $h_1$ and $h_2$; a publicly-undisclosed unidirectional reverse replacement $h_1^{-1}$ which is a reverse replacement of the trapdoor-equipped unidirectional replacement $h_1$; a publicly-undisclosed unidirectional reverse replacement $h_2^{-1}$ which is a reverse replacement of the trapdoor-equipped unidirectional replacement $h_2$.

Note that the trapdoor-equipped unidirectional replacement $h_1$ corresponds to a first trapdoor-equipped unidirectional replacement. Further, the trapdoor-equipped unidirectional replacement $h_2$ corresponds to a second trapdoor-equipped unidirectional replacement. Further, the unidirectional reverse replacement $h_1^{-1}$ corresponds to a unidirectional reverse replacement. Further, the unidirectional reverse replacement $h_1-2$ corresponds to a second unidirectional reverse replacement.

Here, the wording "compatible" means as follows. Namely, when a single set of input data is subjected to the trapdoor-equipped unidirectional replacements $h_1$ and $h_2$ the same number of times, conditions for acquiring an identical output data is established irrespective of an order in which the input data is subjected to the trapdoor-equipped unidirectional replacements $h_1$ and $h_2$. More specifically, from the encryption key generation device 20, output data of the same value is resulted from the following cases: (i) a certain set of input data is subjected to the trapdoor-equipped unidirectional replacement $h_1$ once, and then to the trapdoor-equipped unidirectional replacement $h_2$ once; or (ii) the certain set of input data is subjected to the trapdoor-equipped unidirectional replacement $h_2$ once, and then to the trapdoor-equipped unidirectional replacement $h_1$ once.

The unidirectional reverse replacement $h_1^{-1}$ is a reverse replacement of the trapdoor-equipped unidirectional replacement $h_1$. Thus, in the encryption key generation device 20, the original input data is acquired by subjecting, to the unidirectional reverse replacement $h_1^{-1}$, output data resulted by subjecting the input data to the trapdoor-equipped unidirectional replacement $h_1$. The same goes for a case of the trapdoor-equipped unidirectional replacement $h_2$ and the unidirectional reverse replacement $h_2^{-1}$. That is, the unidirectional reverse replacement $h_2^{-1}$ is a reverse replacement of the trapdoor-equipped unidirectional replacement $h_2$. Therefore, in the encryption key generation device 20, the original input data is acquired by subjecting, to the unidirectional reverse replacement $h_2^{-1}$, output data resulted by subjecting the input data to the trapdoor-equipped unidirectional replacement $h_2$.

Note that the encryption key generation device 20 employs the trapdoor-equipped unidirectional replacement $h_2$ which is compatible with the trapdoor-equipped unidirectional replacement $h_1$, but not the same. Thus, the respective values of all the scramble keys generated by the trapdoor-equipped unidirectional replacements $h_1$ and $h_2$ are prevented from being the same. Further, in general, the trapdoor-equipped unidirectional replacement $h_1$ and the unidirectional reverse replacement $h_1^{-1}$ are also compatible with each other. However, it is unlikely that the encryption key generation device 20 uses the unidirectional reverse replacement $h_1^{-1}$ as the trapdoor-equipped unidirectional replacement $h_2$. In other words, the encryption key generation device 20 uses the trapdoor-equipped unidirectional replacement $h_2$ which differs from the unidirectional reverse replacement $h_1^{-1}$. This also prevents the respective values of all the scramble keys generated by the trapdoor-equipped unidirectional replacements $h_1$ and $h_2$ from being the same.

The following describes in detail generation of the scramble keys and time key in the encryption key generation device 20. The generation of the scramble keys and time key in the encryption key generation device 20 starts from a process in which the encryption key generation device 20 reads out a predetermined initial encryption key from the initial key database 22. Here, the initial key database 22 stores a plurality of different initial encryption keys. In the present embodiment, a size of each of the initial encryption keys is 1000 bits. The scramble key generation unit 26 accesses to the initial key database 22, and randomly reads out one of the initial encryption keys from the initial key database 22.

At the same time, in the encryption key generation device 20, the replace function database 24 stores therein data defining the trapdoor-equipped unidirectional replacements $h_1$ and $h_2$, the unidirectional reverse replacement $h_1^{-1}$ and the $h_2^{-1}$. The scramble key generation unit 26 accesses to the replace function database 24, and reads out definition data of the unidirectional reverse replacement $h_1^{-1}$ and that of the trapdoor-equipped unidirectional replacement $h_2$. That is, the scramble key generation unit 26 performs a replace operation of the unidirectional reverse replacement $h_1^{-1}$ based on the data defining the unidirectional reverse replacement $h_1^{-1}$. Further, the scramble key generation unit 26 performs a replace operation of the trapdoor-equipped unidirectional replacement $h_2$ based on the data defining the trapdoor-equipped unidirectional replacement $h_2$.

The scramble key generation unit 26 subjects the initial encryption key having been read out at least once to the unidirectional reverse replacement $h_1^{-1}$ and at least once to the trapdoor-equipped unidirectional replacement $h_2$, thereby generating a plurality of different scramble keys for encrypting the distribution data. For example, the scramble key generation unit 26 subjects the initial encryption key to the unidirectional reverse replacement $h_1^{-1}$ once and to the trapdoor-equipped unidirectional replacement $h_2$ once, thereby generating the first scramble key. Next, the scramble key generation unit 26 subjects the initial encryption key to the unidirectional reverse replacement $h_1^{-1}$ twice, and to the trapdoor-equipped unidirectional replacement $h_2$ twice, thereby generating the second scramble key.

As described, the scramble key generation unit 26 subjects the initial encryption key to the unidirectional reverse replacement $h_1^{-1}$ and the trapdoor-equipped unidirectional replacement $h_2$ n times (n is an integer and is 1 or higher), thereby generating n scramble keys which are different from one another. The scramble key generation unit 26 outputs the generated scramble keys to a distribution data encryption unit 12. Further, the scramble key generation unit 26 outputs any one of the scramble keys generated to the time key generation unit 28. The scramble key serves as original data by which the time key generation unit 28 generates a time key.

To the time key generation unit 28, any one of the scramble keys generated by the scramble key generation unit 26 is input. Further, the time key generation unit 28 accesses to the replace function database 24, and reads out data defining the unidirectional reverse replacement $h_1^{-1}$. That is, the time key generation unit 28 performs replace operation of the unidirectional reverse replacement $h_1^{-1}$, based on the read out definition data.

Here, the time key generation unit 28 subjects the input scramble key at least once to the unidirectional reverse replacement $h_1^{-1}$. For example, the time key generation unit 28 subjects the scramble key to the unidirectional reverse replacement $h_1^{-1}$ once, thereby generating the first time key. Further, the time key generation unit 28 subjects the scramble key to the unidirectional reverse replacement $h_1^{-1}$ three times, thereby generating a third time key. That is, by modifying the number of times the scramble keys are subjected to the unidirectional reverse replacement $h_1^{-1}$, the time key generation unit 28 generates a time key which allows regeneration of a different range (number) of scramble keys. Note that the time key generation unit 28 outputs the generated time key to a time key distribution unit 16.

The following describes with reference to FIG. 1, an exemplary operation in which a time-limited distribution data is distributed in the encrypted data distribution system 1, by using the scramble keys and time key generated by the encryption key generation device 20. As shown in FIG. 1, the encrypted data distribution device 10 includes: a distribution data encryption unit 12 (encrypted data generation means); an encrypted data distribution unit 14; a time key distribution unit 16 (master encryption key distribution means); and an encryption key generation device 20. On the other hand, the encrypted data receiving device 30 includes: a replace function database 31; a time key reception unit 32 (encrypted data receiving device); a scramble key regeneration unit 33 (individual encryption key regeneration means, individual encryption key regeneration device); an encrypted data reception unit 34; and a distribution data decryption unit 35 (distribution data decryption means).

In the encrypted data distribution device 10, distribution data to be distributed is input to the distribution data encryption unit 12. Further, the scramble keys generated by the encryption key generation device 20 are also input to the distribution data encryption unit 12. The distribution data encryption unit 12 encrypts the input distribution data, with a use of the input scramble keys, thereby generating encrypted data. Then, the distribution data encryption unit 12 outputs the generated encrypted data to the encrypted data distribution unit 14. The encrypted data distribution unit 14 distributes the received encrypted data to the encrypted data receiving device 30 via a communication network.

Meanwhile, in the encrypted data distribution device 10, the time key generated by the encryption key generation device 20 is input to the time key distribution unit 16. The time key distribution unit 16 distributes the input time key to the encrypted data receiving device 30, via a communication network.

In the encrypted data receiving device 30, the time key reception unit 32 receives the time key distributed. Then, time key input means outputs the received time key to the scramble key regeneration unit 33. Here, the replace function database 31 stores beforehand definition data of the trapdoor-equipped unidirectional replacement $h_1$ and that of the trapdoor-equipped unidirectional replacement $h_2$. This is because the trapdoor-equipped unidirectional replacements $h_1$ and $h_2$ are publicly disclosed as hereinabove described. The scramble key regeneration unit 33 accesses to the replace function database 31, and reads out the definition data of the trapdoor-equipped unidirectional replacement $h_1$ and that of the trapdoor-equipped unidirectional replacement $h_2$. Then, scramble key regeneration unit 33 subjects the time key to the trapdoor-equipped unidirectional replacement $h_1$, based on the definition data defining the trapdoor-equipped unidirectional replacement $h_1$. Further, the scramble key regeneration unit 33 subjects the time key to the trapdoor-equipped unidirectional replacement $h_2$, based on the definition data of the trapdoor-equipped unidirectional replacement $h_2$.

Here, the scramble key regeneration unit 33 subjects the input time key to at least one of the trapdoor-equipped unidirectional replacement $h_1$ and the trapdoor-equipped unidirectional replacement $h_2$. In this way, the scramble key regeneration unit 33 regenerates some of the scramble keys amongst those generated by the encryption key generation device 20. The scramble key regeneration unit 33 then outputs the regenerated scramble keys to the distribution data decryption unit 35.

The encrypted data reception unit 34 receives the encrypted data having been distributed by the encrypted data distribution device 10. The encrypted data reception unit 34 then outputs the received encrypted data to the distribution data decryption unit 35. The distribution data decryption unit 35 decrypts the encrypted data by using the scramble keys being input, thereby restoring the distribution data. The distribution data decryption unit 35 then outputs the restored distribution data to a predetermined output destination. Thus, on the user-side, a limited-use of contents provided by the encrypted data distribution system 1 is possible. For example, a user is able to play a video and/or view broadcasting based on the distribution data is possible.

The scramble key regeneration unit 33 is only able to generate, based on the time key, some of the scramble keys amongst those generated by the encryption key generation device 20. In other words, regardless of the number of times the time key is subjected to either the trapdoor-equipped unidirectional replacement $h_1$ or $h_2$, or both, the scramble key regeneration unit 33 is only able to regenerate some of predetermined scramble keys amongst those for encrypting the distribution data. Accordingly, the encrypted data receiving device 30 to which the regenerated scramble keys are provided from the scramble key regeneration unit 33 is able to decrypt only a portion of plural distribution data sets encrypted by the scramble keys in the distribution data encryption unit 12. Thus, only a portion of the distributed encrypted data is usable on the user-side.

With reference to FIG. 3, the following describes the principal by which the scramble key regeneration unit 33 is only able to regenerate, by using the time key, some of the scramble keys amongst those generated by the encryption key generation device 20. FIG. 3 is an explanatory diagram showing a regeneration principal of the scramble keys in the scramble key regeneration unit 33, and calculation principal of the scramble keys and time key in the encryption key generation device 20.

In the example presented in FIG. 3, the scramble key $k_1$ is the initial encryption key, and is also a scramble key. As shown in the figure, the scramble key generation unit 26 subjects the scramble key $k_1$ to the unidirectional reverse replacement $h_1^{-1}$ once, and to the trapdoor-equipped unidirectional replacement $h_2$ once, thereby generating a scramble key $k_2$. Subsequently, the scramble key generation unit 26 subjects the scramble keys k2 to the unidirectional reverse replacement $h_1^{-1}$ and the trapdoor-equipped unidirectional replacement $h_2$ once, thereby generating a scramble key $k_3$.

In other words, the scramble key generation unit 26 recursively subjects the generated scramble key to the unidirectional reverse replacement $h_1^{-1}$ and the trapdoor-equipped unidirectional replacement $h_2$ once, thereby generating different scramble keys as a series of scramble keys $k_1$ to $k_n$ for encrypting the distribution data.

Here, it is supposed that the, amongst a series of the scramble keys $k_1$ to $k_n$, the time key generation unit 28 is ordered to generate a time key that allows regeneration of scramble keys $k_1$ to $k_4$. In this case, the time key generation unit 28 generates a time key $g_{1,4}$, by subjecting the scramble key $k_1$ to the unidirectional reverse replacement $h_1^{-1}$ three times.

Thus, in the encrypted data receiving device 30, the scramble key regeneration unit 33 regenerates by using the time key $g_{1,4}$ some of the series of scramble keys $k_1$ to $k_n$ starting from the scramble key $k_1$. In this case, the scramble key regeneration unit 33 is able to regenerate 4 scramble keys (scramble keys $k_1$ to $k_n$) at the most, by using the time key $g_{1,4}$. That is, the scramble key regeneration unit 33 generates the scramble key $k_1$ by subjecting the time key $g_{1,4}$ to the trapdoor-equipped unidirectional replacement $h_1$ three times. Further, the scramble key regeneration unit 33 generates the scramble key $k_2$ by subjecting the time key $g_{1,4}$ to the trapdoor-equipped unidirectional replacement $h_1$ twice, and to the trapdoor-equipped unidirectional replacement $h_2$ once. Further, the scramble key regeneration unit 33 generates the scramble key $k_3$ by subjecting the time key $g_{1,4}$ to the trapdoor-equipped unidirectional replacement $h_1$ once, and to the trapdoor-equipped unidirectional replacement $h_2$ twice. Further, the scramble key regeneration unit 33 generates a scramble key $k_3$ by subjecting the time key $g_{1,4}$ to the trapdoor-equipped unidirectional replacement $h_2$ three times.

Here, the time key $g_{1,4}$ needs to be subjected to the unidirectional reverse replacement $h_1^{-1}$ once, so that the scramble key regeneration unit 33 regenerates a scramble key $k_5$ from the time key $g_{1,4}$. However, the scramble key regeneration unit 33 is not able to use the unidirectional reverse replacement $h_1^{-1}$. This is because the unidirectional reverse replacement $h_1^{-1}$ is not publicly disclosed as mentioned hereinabove. In other words, the replace function database 31 does not store therein data defining the unidirectional reverse replacement $h_1^{-1}$. Further, it is extremely difficult for the scramble key regeneration unit 33 to derive the unidirectional reverse replacement $h_1^{-1}$ based on the publicly-disclosed trapdoor-equipped unidirectional replacements $h_1$ and $h_2$, unless trapdoor information is input to the scramble key regeneration unit 33. Here, the expression "difficult" means the following. Although it is theoretically possible to derive the unidirectional reverse replacements $h_1^{-1}$ and $h_2^{-1}$ by means of a certain algorithm, an enormous amount of calculations will be involved to complete the algorithm. Thus, the expression "difficult" means that it is unfeasible to derive the unidirectional reverse replacements $h_1^{-1}$ and $h_2^{-1}$ within a realistic and practical period even with a use of currently known fastest computer let alone the human calculation. Due to such a difficulty, the scramble key regeneration unit 33 is not able to regenerate the scramble key $k_5$ from the time key $g_{1,4}$. Similarly, the scramble key regeneration unit 33 is not able to regenerate the scramble key $k_5$ and scramble keys subsequent to the scramble key $k_5$, when using the time key $g_{1,4}$. Because, to generate from the time key $g_{1,4}$, the scramble key $k_5$ or any one of the scramble keys subsequent to the scramble key $k_5$, the time key $g_{1,4}$ needs to be subjected at least once to the unidirectional reverse replacement $h_1^{-1}$.

Furthermore, with the use of the time key $g_{1,4}$, the scramble key regeneration unit 33 is not able to regenerate a scramble key which precedes the scramble key $k_1$, either. This is because the time key $g_{1,4}$ needs to be subjected at least once to the unidirectional reverse replacement $h_2^{-1}$, to regenerate a scramble key preceding the scramble key $k_1$ such as a scramble key $k_0$ (not shown) or a scramble key $k_{-1}$ (not shown). As is the case of the unidirectional reverse replacement $h_1^{-1}$, it is also extremely difficult to derive the unidirectional reverse replacement $h_2^{-1}$ from the trapdoor-equipped unidirectional replacement $h_2$, unless trapdoor information of the trapdoor-equipped unidirectional replacement $h_2$ is publicly disclosed. Accordingly, the scramble key regeneration unit 33 is not able to regenerate all the scramble keys preceding the scramble key $k_1$, with the use of time key $g_{1,4}$.

Note that the scramble key regeneration unit 33 is able to regenerate the scramble key $k_4$ from the time key $g_{1,4}$. However, even by using the scramble key $k_4$, the scramble key regeneration unit 33 is not able to regenerate the scramble key $k_5$ or scramble keys subsequent to the scramble key $k_5$. This is because the scramble key $k_4$ has to be subjected at least once to the unidirectional reverse replacement $h_2^{-1}$, for generating from the scramble key $k_4$, the scramble key $k_5$ or scramble keys subsequent to the scramble key $k_5$. In other words, the scramble key regeneration unit 33 is not able to generate a scramble key which is out of a certain range even with a use of a regenerated scramble key that falls within the limited range. Specifically, even with a use of any encryption keys regenerated from the time key $g_{1,4}$, the scramble key regeneration unit 33 is only able to regenerate the scramble keys $k_1$ to $k_4$, out of the series of the scramble keys $k_1$ to $k_n$.

As described, when the time key $g_{1,4}$ is used as the time key, the scramble key regeneration unit 33 is able to regenerate only the scramble keys $k_1$ to $k_4$ amongst the series of the scramble keys $k_1$ to $k_n$. In other words, the scramble key regeneration unit 33 is only able to regenerate some of the plural scramble keys generated. Note that the range of scramble keys the scramble key regeneration unit 33 is able to regenerate is dependent on the time key. That is, when a different time key is used, scramble key regeneration unit 33 is able to regenerate a different range of the scramble keys $k_1$ to $k_n$.

For example, in the case of FIG. 3, the scramble key regeneration unit 33 is able to regenerate scramble keys $k_2$ to $k_6$, when a time key $g_{2,6}$ is used as the time key. Note that, the time key $g_{2,6}$ is generated by subjecting the scramble key $k_2$ to the unidirectional reverse replacement $h_1^{-1}$ four times in the time key generation unit 28 of the encryption key generation device 20. The scramble key regeneration unit 33 generates the scramble keys by suitably subjecting the time key $g_{2,6}$ to the trapdoor-equipped unidirectional replacements $h_1$ and $h_2$. Here, as shown in FIG. 3, with the time key $g_{2,6}$, any one of the scramble keys $k_2$ to $k_6$ is regenerated by the trapdoor-equipped unidirectional replacements $h_1$ and $h_2$. However, as mentioned above, it is necessary to perform the unidirectional reverse replacement $h_2^{-1}$ at least once, for regenerating the scramble key $k_1$ or any scramble key preceding the scramble key $k_1$ based on the time key $g_{2,6}$. Further, it is necessary to perform the unidirectional reverse replacement $h_1^{-1}$ at least once for regenerating the scramble key $k_7$ or any scramble keys subsequent to the scramble key $k_7$ based on the time key $g_{2,6}$. Accordingly, the scramble keys that can be regenerated by the scramble key regeneration unit 33 based on the time key $g_{2,6}$ are limited to the scramble keys $k_2$ to $k_6$.

The following describes another example. As shown in FIG. 3, when a time key $g_{5,7}$ is used as the time key, the scramble key regeneration unit 33 is able to regenerate only scramble keys $k_5$ to $k_7$. Note that, the time key $g_{5,7}$ is generated by subjecting the scramble key $k_5$ to the unidirectional reverse replacement $h_1^{-1}$ twice in the time key generation unit 28 of the encryption key generation device 20. The scramble key regeneration unit 33 generates the scramble keys by suitably subjecting the time key $g_{5,7}$ to the trapdoor-equipped unidirectional replacements $h_1$ and $h_2$. Here, as shown in FIG. 3, with the time key $g_{5,7}$, any one of the scramble keys $k_5$ to $k_7$ is regenerated by the trapdoor-equipped unidirectional replacements $h_1$ and $h_2$. However, as mentioned above, the unidirectional reverse replacement $h_2^{-1}$ has to be performed at least once, for regenerating the scramble key $k_4$ or any scramble key preceding the scramble key $k_4$ based on the time key $g_{5,7}$. Further, the unidirectional reverse replacement $h_1^{-1}$ has to be performed at least once, for regenerating the scramble key $k_8$ or any scramble keys subsequent to the scramble key $k_8$ based on the time key $g_{5,7}$. Accordingly, the scramble keys that can be regenerated by the scramble key regeneration unit 33 based on the time key $g_{5,7}$ are limited to the scramble keys $k_5$ to $k_7$.

As described, when generating a scramble key, the scramble key generation unit 26 in the encryption key generation device 20 subjects an initial encryption key to the unidirectional reverse replacement $h_1^{-1}$ at least once, and to the trapdoor-equipped unidirectional replacement $h_2$ at leas once without an exception. Accordingly, amongst the scramble keys generated by the scramble key generation unit 26, other scramble keys are not generated unless the scramble keys are subjected to either the unidirectional reverse replacement $h_1^{-1}$ or the unidirectional reverse replacement $h_2^{-1}$, or both. In other words, the scramble keys generated by the scramble key generation unit 26 are not mutually converted into other scramble keys in the encrypted data receiving device 30 of a user.

On the other hand, in the encryption key generation device 20, the time key generation unit 28 subjects the initial encryption key to the unidirectional reverse replacement $h_1^{-1}$ at least once, when generating a time key. Accordingly, the scramble key regeneration unit 33 is capable of regenerating only some of the plural scramble keys, by suitably subjecting the time key to either the trapdoor-equipped unidirectional replacements $h_1$ or $h_2$, or both. As described, the encryption key generation device 20 is able to efficiently and flexibly generate the scramble keys for encrypting or decrypting the distribution data, and the time key which allows regeneration of some of the scramble keys.

As such, by streaming encrypted data with the use of the scramble keys and time key generated by the encryption key generation device 20, it is possible to limit a period during which the distribution data can be used. One example is provided hereinbelow.

First, the encrypted data distribution device 10 streams encrypted data based on a predetermined clock signal generated by clock means. In other words, for example, the scramble key generation unit 26 in the encryption key generation device 20 successively generates different scramble keys at a predetermined interval (e.g. at every minute) in synchronization with a predetermined clock signal. In this way, the scramble key generation unit 26 successively renews a large number of scramble keys in a short period. Meanwhile, the distribution data encryption unit 12 encrypts plural sets of distribution data by using the scramble keys which are renewed to different scramble keys in the short period. In this way, the encrypted data distribution unit 14 distributes to the encrypted data receiving device 30 the plural sets of the distribution data, each of which set are encrypted by different scramble keys at a different times.

On the other hand, the scramble key regeneration unit 33 generates only some of the scramble keys: i.e., those scramble keys which decrypts a set of encrypted data distributed within a predetermined time limit. Hence, the encrypted data receiving device 30 is able to decrypt the set of encrypted data distributed within the predetermined time limit by using the scramble keys decrypted by the scramble key regeneration unit 33. As described, with the use of the encryption key generation device 20, a time-limited type information system is provided.

As described, an encryption key generation device 20 of the present invention executes an encryption key generation method which generates encryption keys by (i) a first trapdoor-equipped unidirectional replacement $h_1$ and a second trapdoor-equipped unidirectional replacement $h_2$ which are compatible and publicly disclosed, (ii) a first unidirectional reverse replacement $h_1^{-1}$ which is a reverse replacement of the first trapdoor-equipped unidirectional replacement $h_1$ and which is not publicly disclosed, and (iii) a second unidirectional reverse replacement $h_2^{-1}$ which is a reverse replacement of the second trapdoor-equipped unidirectional replacement $h_2$ and which is not publicly disclosed, the method including the steps of: (A) generating a plurality of different scramble keys, for encrypting distribution data, by subjecting a predetermined initial encryption key at least once to the first unidirectional reverse replacement $h_1^{-1}$ and at least once to the second trapdoor-equipped unidirectional replacement $h_2$; and (B) generating a time key by subjecting any one of the generated scramble keys at least once to at least one of the first unidirectional reverse replacement $h_1^{-1}$ and the second unidirectional reverse replacement $h_2^{-1}$.

The present invention is not limited to the embodiments above, but may be altered within the scope of the claims. An embodiment based on a proper combination of technical means disclosed in different embodiments is encompassed in the technical scope of the present invention.

For example, the encrypted data distribution device 10 may include time key encryption means for encrypting a time key by using a terminal encryption key which is uniquely assigned to the encrypted data receiving device 30. With this configuration, the encrypted data distribution device 10 is able to distribute a time key, which is restorable to its original format only in a specific terminal, to the encrypted data receiving device 30 via a communication network. Accordingly, it is possible to prevent regeneration of scramble keys with a time key input to an encrypted data receiving device 30 used by an unauthorized third person.

Note that the encrypted data distribution device 10 does not necessarily have to be provided with the time key distribution unit 16. For example, in the encrypted data distribution system 1, a time key which is generated by the encryption key generation device 20 in the encrypted data distribution device 10 may be stored in a storage medium, and sold to a user of an encrypted data receiving device 30. In this case, the user needs to input the time key in the storage medium to the user's encrypted data receiving device 30. In other words, the encrypted data receiving device 30 includes time key input means for accepting an input of a time key, and accepts an input of a time key. The encrypted data receiving device 30 regenerates scramble keys using the input time key.

Both of the trapdoor-equipped unidirectional replacements $h_1$ and $h_2$ used in the encryption key generation device 20 are preferably an RSA function. That is, it is preferable that the encryption key generation device 20 use $x^{e1}$ (mod n) as the trapdoor-equipped unidirectional replacement $h_1$, and $x^{e2}$ (mod n) as the trapdoor-equipped unidirectional replacement $h_2$. Here, x is input data to be subjected. p and q are respectively different prime numbers. n is p×q. Each of $b_0$, $b_1$, and $b_2$ is a positive integer which can not divide the minimum common factor of p−1 and q−1 and which can not be divided by the common factor. $e_1$ is $b_0 \times b_1$. $e_2$ is $b_0 \times b_2$. n, $e_1$, and $e_2$ are publicly disclosed. As is already known, it is extremely difficult to derive an inverse function of the $x^{e1}$ (mod n) or that of the $X^{e2}$ (mod n), even with the publicly disclosed n, $e_1$, and $e_2$, unless trapdoor information is known.

As described, the encryption key generation device 20 may adopt the widely distributed RSA function. Doing so will allow generation of scramble keys and time key having practical encryption strength.

Further, it is preferable that the trapdoor-equipped unidirectional replacements $h_1$ and $h_2$ satisfy a cross-unidirectional characteristic. With the configuration, it is possible to further reduce the possibility that the unidirectional reverse replacements $h_1^{-1}$ and $h_2^{-1}$ being derived from the publicly-disclosed trapdoor-equipped unidirectional replacements $h_1$ and $h_2$, without knowing trapdoor information. Accordingly, generated scramble keys and time key are made further confidential.

Further, the scramble key generation unit 26 may subject generated scramble keys at least once to the unidirectional reverse replacement $h_1^{-1}$ and at least once to the trapdoor-equipped unidirectional replacement $h_2$. In this way, the scramble key generation unit 26 is able to generate new scramble keys that are different. In this case, the scramble key generation unit 26 recursively generates new scramble keys using the scramble keys having been generated as new input data. Accordingly, the encryption key generation device 20 is able to efficiently generate a series of scramble keys $k_1$ to $k_n$.

Further, the scramble key regeneration unit 33 provided in the encrypted data receiving device 30 may be a device of an independent configuration. In other words, a scramble key regeneration device (individual key regeneration device) of the present invention may be a device which regenerates some of scramble keys amongst those generated by subjecting an input time key to either the trapdoor-equipped unidirectional replacement $h_1$ or the trapdoor-equipped unidirectional replacement $h_2$, or both, in the encryption key generation device 20.

Further, the size of an initial encryption key may be any size (preferably 1000 bits or more), and is not limited to 1000 bits.

Further, the scramble key generation unit 26 may successively generate different scramble keys at any predetermined interval (e.g. 1 msec, 100 msec, 1 min., 10 min., etc) in synchronization with a predetermined clock signal, and the interval is not limited to 1 min.

Further, the time key generation unit 28 may generate a time key by subjecting any one of the input scramble keys at least once to at least one of the unidirectional reverse replacement $h_1^{-1}$ and the unidirectional reverse replacement $h_2^{-1}$. That is, the time key generation unit 28 may generate a time key by subjecting a scramble key to the unidirectional reverse replacement $h_1^{-1}$ and the unidirectional reverse replacement $h_2^{-1}$ once. Alternatively, the time key generation unit 28 may generate a time key by subjecting a scramble key three times to the unidirectional reverse replacement $h_2^{-1}$. Note that data defining the unidirectional reverse replacement $h_2^{-1}$ used in the time key generation unit 28 is stored in the replace function database 24 as is the case of data defining the unidirectional reverse replacement $h_1^{-1}$. Further, increasing the number of times the unidirectional reverse replacement $h_1^{-1}$ and $h_2^{-1}$ are performed will allow the time key generation unit 28 to generate a time key which covers a wider range (larger number) of scramble keys.

For example, the time key generation unit 28 is able to generate the time key $g_{2,6}$ of FIG. 3 by subjecting the scramble key $k_6$ shown in FIG. 3 to the unidirectional reverse replacement $h_2^{-1}$ four times. Further, the time key $g_{2,6}$ can be also generated by subjecting the scramble key $_5$ of FIG. 3 to the unidirectional reverse replacement $h_1^{-1}$ once, and the unidirectional reverse replacement $h_2^{-1}$ three times. Further, the time key $g_{2,6}$ can be also generated by subjecting the scramble key $k_4$ of FIG. 3 to the unidirectional reverse replacement $h_1^{-1}$ and the unidirectional reverse replacement $h_2^{-1}$ twice each.

Furthermore, the initial encryption key also serve as a scramble key. Here, the initial encryption key may be input to the time key generation unit 28. In this case, the time key generation unit 28 generates a time key by subjecting the input initial encryption key at least once to at least one of the unidirectional reverse replacement $h_1^{-1}$ and the unidirectional reverse replacement $h_2^{-1}$. This also allows the time key generation unit 28 to create a time key capable of regenerating some of scramble keys amongst those generated by the scramble key generation unit 26.

As described, with the encryption key generation device 20, the encrypted data receiving device 30 which is a terminal to be used by a user does not have to be provided in advance with particular information or procedure that cannot be disclosed to a third person. Accordingly, the encrypted data receiving device 30 is able to regenerate scramble keys usable in time-limited type information services, without a need of special highly-tamper-resistant hardware. That is, the encrypted data receiving device 30 can be realized at a lower cost than a terminal device incorporating therein special hardware.

Further, the encryption key generation device 20 is able to generate a time key capable of flexibly setting the time limit. Since a time key is generated in the encryption key generation device 20 by the unidirectional reverse replacement $h_1^{-1}$, the size of the generated time key is constant irrespective of the number of scramble keys covered. Therefore, even in a case of generating a time key capable of regenerating massive amount of scramble keys, the size of the time key remains unvaried. Thus, it is possible to compactly exchange encryption information such as a time key.

In the encrypted data distribution system 1, the time key provided to the encrypted data receiving device 30 is automatically validated upon start of a certain prescribed period, while it is automatically invalidated upon elapse of the prescribed period. Accordingly, the encrypted data distribution device 10 does not need to administrate a time key to be distributed to the encrypted data receiving device 30. Thus, an administrator who provides contents via the encrypted data distribution device 10 can be unburdened.

Further, in the encryption key generation device 20, any one of scramble keys can be regenerated by subjecting a time key to the trapdoor-equipped unidirectional replacement $h_1$ or $h_2$ a predetermined number of times. It is necessary to perform at least one of the unidirectional reverse replacement $h_1^{-1}$ and $h_2^{-1}$ to generate other scramble keys from a scramble key. Since it is extremely difficult to do so, a time key generated by the encryption key generation device 20 has remarkably high resistant against unauthorized decryption by reverse engineering technology or the like. Thus, with the encryption key generation device 20, it is possible to provide an encrypted data distribution system 1 with a remarkably high encryption strength.

Note that each of the above-described members (means) is a functional block. As such, these members are realized by causing calculation means such as CPU to execute the encryption key generation program stored in a storage unit (not shown) to control peripheral circuits (not shown) such as an input/output circuit.

Accordingly, the objectives of the present invention can be achieved by: supplying, to the encryption key generation device, a storage medium containing in a computer-readable manner a program code (execution format program, intermediate code program, source program) of the encryption key generation program which is software for realizing the above-described functions; and causing a computer (or CPU, MPU, DSP) of the encryption key generation device to read out and execute the program in the storage medium.

In this case, the program code itself having read out from the storage medium realizes the above-described functions, and therefore a storage medium storing such a program code constitutes the present invention.

Meanwhile, each of the above-described members may be realized in a form of hardware that performs a process as is done by the above-described software. In this case, the objectives of the present invention are achieved by an encryption key generation device in a form of hardware.

Here, the calculation means for executing the program code may be a single unit. Alternatively, a plurality of calculation means each connected via a bus inside the encryption key generation device or various communication paths may execute in cooperation with one another the program code.

Here, the program code directly executable by calculation means may be distributed to the encryption key generation device, via a computer-readable storage medium storing the program code. Further, the program code may be distributed to the encryption key generation device via a computer-readable storage medium storing the program code in a form of data from which the program code is generated through an extraction process or the like, as hereinafter described. Alternatively, the program code or the data may be distributed to the encryption key generation device via a wireless/wired communication path for transferring data. No matter in which way the program code is distributed, the program code is executed by the calculation means of the encryption key generation device.

In this case, the program code or the data can be transferred via any communication network. Specifically, such a communication network can be: Internet, intranet, extranet, LAN, ISDN, VAN, CATV communication networks, virtual private networks, telephone communication networks, mobile communication networks, and satellite communication networks. Further, a variety of mediums (communication path) constituting the communication network, including a wired line and a radio transmission, can be used as the transmission medium constructing the communication network. Examples of the wired line are an IEEE 1394, USB, a power-line carrier, a cable television circuit, a telephone line, and an ADSL line. Examples of the radio transmission are infrared-ray such as IrDA or a remote control, Bluetooth, 802.11 radio transmission, HDR, mobile telephone networks, satellite connections, and terrestrial digital networks.

Note that a storage medium for distributing the program code to the encryption key generation device is preferably detachable, before the program code is distributed. However, after the distribution of the program code, the storage medium may be detachable from the encryption key generation device or be combined in a undetachable manner with the encryption key generation device.

Further, the storage medium may be a read-only or re-writable storage medium, provided that the program code is written in. The storage medium further may be volatile or non-volatile storage medium. Further, a method of writing the program code into a storage medium or the shape of the storage medium can be any given method or shape.

Examples of a storage medium that meets these conditions are: a tape such as a magnetic tape or a cassette tape; a magnetic disc such as a Floppy® disc or a hard disk; a disc such as a CD-ROM, a magnettooptical disc (MO), a mini disc (MD), or a digital video disc (DVD); a card memory such as an IC card or an optical card; a semiconductor memory such as a mask ROM, EPROM, EEPROM, or flash ROM; or a memory such as a CPU built in the calculation means.

Note that a program for reading out the program code from a storage medium and storing the codes in a main memory is stored in the encryption key generation device in a computer-executable manner. Further, in a case where the program code is distributed to the encryption key generation device via a communication network, a program for downloading the program code via the communication network is stored in advance in the encryption key generation device in a computer-executable manner.

Further, the program code is a code for instructing the above-described processing to the calculation means. Note that the computer may already have a basic program (e.g., operating system or library) capable executing a part or the entire processing of the program code by calling the program according to a predetermined procedure. In this case, a part or the entire procedure in the program code of the encryption key generation program may be replaced with a code or a pointer which instructs the calculation means to call the basic program.

Further, the encryption key generation program may be stored in a storage medium similarly to an arrangement of the program code in an real memory. Specifically, the encryption key generation program may be stored in a storage medium in a format such that the calculation means is able to execute the program code by accessing to the storage medium. Alternatively, the encryption key generation program stored in the storage medium may be in a format of a program yet to be read into the real memory, and in which format the program is installed in a local storage medium such as a hard disk that can be always accessed by the calculation means. Further, it is possible to store the encryption key generation program in the storage medium in a format of a program yet to be installed in a local storage medium via/from a communication network or a portable storage medium.

Further, the encryption key generation program is not limited to an object code having been compiled. For example, the encryption key generation program may be stored in a storage medium in a form of source code. Alternatively, the encryption key generation program may be stored in a storage medium in a form of an intermediate code which is generated in a interpreting or compiling process.

In either cases, the program code (intermediate code) stored in the storage medium is convertible to a format the calculation means is able to execute.

That is, the program code (intermediate code) may be in any format, provided that the calculation means is able to execute the program by using a predetermined format converting program which performs singly or in combination: a process of extraction a compressed program code; a process of restoring encoded program code; a process of interpreting or compiling the source code; a process of linking to the program; or a process of arranging the program in a real memory. Thus, similar effects are obtained regardless of the format in which the encryption key generation program is stored in the storage medium.

The present invention is not limited to the embodiments above, but may be altered within the scope of the claims. An embodiment based on a proper combination of technical means disclosed in different embodiments is encompassed in the technical scope of the present invention.

As described, an encryption key generation device of the present invention includes: individual encryption key generation means for generating a plurality of different individual encryption keys, for encrypting input data, by subjecting a predetermined initial encryption key at least once to the first unidirectional reverse replacement and at least once to the second trapdoor-equipped unidirectional replacement; and master encryption key generation means for generating a master encryption key by subjecting any one of the individual encryption keys generated by said individual encryption keys generation means at least once to at least one of the first unidirectional reverse replacement and the second unidirectional reverse replacement. Thus, it is possible to efficiently and flexibly generate: a plurality of individual encryption keys for encrypting and decrypting input data; and a master key which allows regeneration of only some of the individual encryption keys.

Further, the encryption key generation device of the present invention is preferably adapted so that each of the first and second trapdoor-equipped unidirectional replacements is an RSA function.

With the configuration, the encryption key generation device can adopt a widely distributed RSA function. Thus, generation of individual encryption keys and a master encryption key having a practical encryption strength is possible.

Further, the encryption key generation device of the present invention is preferably adapted so that the first and second trapdoor-equipped unidirectional replacements satisfy a cross-unidirectional characteristic.

Thus, a possibility of the first and second unidirectional reverse replacements being derived from the publicly disclosed first and second trapdoor-equipped unidirectional replacements without trapdoor information is further lowered. Accordingly, the generated individual encryption keys and master encryption key are made further confidential.

Further, the encryption key generation device of the present invention is preferably adapted so that said individual encryption key generation means subjects any one of the generated individual encryption keys at least once to the first unidirectional reverse replacement and at least once to the second trapdoor-equipped unidirectional replacement, so as to generate a new individual encryption key that is different.

In the configuration, the individual encryption key generation means recursively generates a new individual encryption key by using any one of the individual encryption keys having already generated as new input data. Accordingly, the encryption key generation device is able to more efficiently generate a plurality of different individual encryption keys.

Industrial Applicability

The present invention is applicable to a time-limited network accessing service such as a public hot spot service which meet demand of each user. Further, the present invention is applicable to a scramble broadcasting by which a program can be viewed at a specific period of time. For example, it is possible to offer a discount for a night-time limited audiovisual service. Further, by storing a time key in an IC card as a master key, it is possible to permit the IC card holder to enter a room of a particular facility during a specific period of time. The present invention is also applicable to a time-limited wireless LAN service, or to trial version of various multimedia services. Further, the present invention is applicable to a service of regulating a use of software or data base, or regulating accessible servers.

The invention claimed is:

1. An encryption key generation device which generates encryption keys by (i) a first trapdoor-equipped unidirectional replacement and a second trapdoor-equipped unidirectional replacement which are compatible and publicly disclosed, (ii) a first unidirectional reverse replacement which is a reverse replacement of the first trapdoor-equipped unidirectional replacement and which is not publicly disclosed, and (iii) a second unidirectional reverse replacement which is a reverse replacement of the second trapdoor-equipped unidirectional replacement and which is not publicly disclosed, said device comprising:

individual encryption key generation means for generating a plurality of different individual encryption keys, for encrypting and decrypting input data, by subjecting a predetermined initial encryption key at least once to the first unidirectional reverse replacement and at least once to the second trapdoor-equipped unidirectional replacement; and master encryption key generation means for generating a master encryption key, for regenerating the individual encryption keys, by subjecting any one of the individual encryption keys generated by said individual encryption keys generation means at least once to at least one of the first unidirectional reverse replacement and the second unidirectional reverse replacement, wherein the first trapdoor-equipped unidirectional replacement is an RSA function $x^{e1}$ (mod n), and the second trapdoor-equipped unidirectional replacement is an RSA function $x^{e2}$ (mod n), where x is input data to be subjected, n=p×q, where p and q are respectively different prime numbers, $e_1 = b_0 \times b_1$, and $e_2 = b_0 \times b_2$, where each of $b_0$, $b_1$, and $b_2$ is a positive integer that cannot divide a minimum common factor of p−1 and q−1 and that cannot be divided by the minimum common factor of p−1 and q−1, and n, $e_1$, and $e_2$ publicly disclosed.

2. The device as set forth in claim 1, wherein the first and second trapdoor-equipped unidirectional replacements satisfy a cross-unidirectional characteristic.

3. The device as set forth in claim 1, wherein said individual encryption key generation means subjects any one of the generated individual encryption keys at least once to the first unidirectional reverse replacement and at least once to the second trapdoor-equipped unidirectional replacement, so as to generate a new individual encryption key that is different.

4. An encrypted data distribution device, comprising:
encrypted data generation means for generating encrypted data by encrypting sets of data to be distributed with a use of individual encryption keys generated by the encryption key generation device as set forth in claim 1; and
encrypted data distribution means for distributing the encrypted data to an encrypted data receiving device via a communication network.

5. An individual encryption key regeneration device, comprising:
master encryption key input means for accepting an input of a master encryption key generated by the encryption key generation device as set forth in claim 1; and
individual encryption key regeneration means for subjecting the input master encryption key to either a first trapdoor-equipped unidirectional replacement or a second trapdoor-equipped unidirectional replacement, or both, thereby partially regenerating individual encryption keys having been generated by the encryption key generation device as set forth in claim 1.

6. An encrypted data receiving device, comprising:
individual encryption key input means for accepting an input of an individual encryption key generated by an individual encryption key regeneration device including master encryption key input means for accepting an input of a master encryption key generated by an encryption key generation device and individual encryption key regeneration means for subjecting the input master encryption key to either a first trapdoor-equipped unidirectional replacement or a second trapdoor-equipped unidirectional replacement, or both, thereby partially regenerating individual encryption keys having been generated by the encryption key generation device;
encrypted data receiving means for receiving encrypted data distributed by an encrypted data distribution device as set forth in claim 4; and
distribution data decryption means for decrypting the received encrypted data by using the input individual encryption key.

7. An encrypted data distribution system, comprising:
an encrypted data distribution device including encrypted data generation means for generating encrypted data by encrypting sets of data to be distributed with a use of individual encryption keys generated by the encryption key generation device and encrypted data distribution means for distributing the encrypted data to an encrypted data receiving device via a communication network; and
the encrypted data receiving device as set forth in claim 5.

8. An encryption key generation method for generating encryption keys by (i) a first trapdoor-equipped unidirectional replacement and a second trapdoor-equipped unidirectional replacement which are compatible and publicly disclosed, (ii) a first unidirectional reverse replacement which is a reverse replacement of the first trapdoor-equipped unidirectional replacement and which is not publicly disclosed, and (iii) a second unidirectional reverse replacement which is a reverse replacement of the second trapdoor-equipped unidirectional replacement and which is not publicly disclosed, said method comprising the steps of:
(A) generating a plurality of different individual encryption keys, for encrypting input data, by subjecting a predetermined initial encryption key at least once to the first unidirectional reverse replacement and at least once to the second trapdoor-equipped unidirectional replacement; and
(B) generating a master encryption key by subjecting any one of the generated individual encryption keys at least once to at least one of the first unidirectional reverse replacement and the second unidirectional reverse replacement,
wherein the first trapdoor-equipped unidirectional replacement is an RSA function $x^{e1}$ (mod n), and the second trapdoor-equipped unidirectional replacement is an RSA function $x^{e2}$ (mod n), where x is input data to be subjected, n=p×q, where p and q are respectively different prime numbers, $e_1 = b_0 \times b_1$, and $e_2 = b_0 \times b_2$, where each of $b_0$, $b_1$, and $b_2$ is a positive integer that cannot divide a minimum common factor of p−1 and q−1 and that cannot be divided by the minimum common factor of p−1 and q−1, and n, $e_1$, and $e_2$ are publicly disclosed.

9. A non-transitory computer-readable storage medium storing therein an encryption key generation program for, when executed on a computer device, performing an encryption key generation method for generating encryption keys by (i) a first trapdoor-equipped unidirectional replacement and a second trapdoor-equipped unidirectional replacement which are compatible and publicly disclosed, (ii) a first unidirectional reverse replacement which is a reverse replacement of the first trapdoor-equipped unidirectional replacement and which is not publicly disclosed, and (iii) a second unidirectional reverse replacement which is a reverse replacement of the second trapdoor-equipped unidirectional replacement and which is not publicly disclosed, said method comprising the steps of:
(A) generating a plurality of different individual encryption keys, for encrypting input data, by subjecting a predetermined initial encryption key at least once to the first unidirectional reverse replacement and at least once to the second trapdoor-equipped unidirectional replacement; and
(B) generating a master encryption key by subjecting any one of the generated individual encryption keys at least once to at least one of the first unidirectional reverse replacement and the second unidirectional reverse replacement,
wherein the first trapdoor-equipped unidirectional replacement is an RSA function $x^{e1}$ (mod n), and the second trapdoor-equipped unidirectional replacement is an RSA function $x^{e2}$ (mod n), where x is input data to be subjected, n=p×q, where p and q are respectively different prime numbers, $e_1 = b_0 \times b_1$, and $e_2 = b_0 \times b_2$ where each of $b_0$, $b_1$, and $b_2$ is a positive integer that cannot divide a minimum common factor of p−1 and q−1 and that cannot be divided by the minimum common factor of p−1 and q−1, and n, $e_1$, $e_2$ are publicly disclosed.

* * * * *